(12) United States Patent
Hogan et al.

(10) Patent No.: US 6,279,632 B1
(45) Date of Patent: Aug. 28, 2001

(54) METHOD TO CONTROL INCREASE IN VISCOSITY DURING AGING OF SILOXANE MODIFIED POLYMERS

(75) Inventors: Terrence E. Hogan, Cuyahoga Falls; Chen-Chy Lin, Hudson; William L. Hergenrother, Akron, all of OH (US)

(73) Assignee: Bridgestone Corporation, Tokyo (JP)

( * ) Notice: Subject to any disclaimer, the term of this patent is extended or adjusted under 35 U.S.C. 154(b) by 0 days.

(21) Appl. No.: 09/449,303

(22) Filed: Nov. 24, 1999

(51) Int. Cl.$^7$ ........................................................ B60C 5/00
(52) U.S. Cl. ........................ 152/450; 525/384; 556/401; 526/82; 528/10
(58) Field of Search ............................ 525/384; 556/401; 526/82; 528/10; 152/450

(56) References Cited

U.S. PATENT DOCUMENTS

| | | | |
|---|---|---|---|
| 3,640,939 | 2/1972 | Geraldo | 260/33.6 |
| 5,659,056 | 8/1997 | Hergenrother et al. | 556/401 |
| 5,811,479 | 9/1998 | Labauze | 524/188 |
| 5,827,922 | * 10/1998 | Chen et al. | |

FOREIGN PATENT DOCUMENTS

| | | | |
|---|---|---|---|
| 0 447 066 A1 | 2/1991 | (EP) | C08L/9/00 |
| 0 661 298 A2 | 12/1994 | (EP) | . |
| 0 801 078 A1 | 4/1997 | (EP) | . |

OTHER PUBLICATIONS

*Kirk–Othmer Encyclopedia of Chemical Technology, Fourth Edition*, vol. 22 "Silicon Esters", pp. 69–81.

Copy of International Search Report.

* cited by examiner

*Primary Examiner*—Robert Dawson
*Assistant Examiner*—Kuo-Liang Peng
(74) *Attorney, Agent, or Firm*—Meredith E. Palmer; Ronald L. Skoglund; John H. Hornickel

(57) ABSTRACT

A method for controlling any increase in Mooney viscosity during aging of siloxane-functionalized polymers includes the step of adding a viscosity stabilizing effective amount of a long chain alcohol preferably selected from the group consisting of aliphatic, cycloaliphatic, and aromatic alcohols having more carbon atoms than the hydrolyzable substituent on the siloxane end groups. The method provides for the stabilization of Mooney viscosity of siloxane-functionalized polymers at any given level upon aging. The long chain alcohols react with the siloxane-functionalized polymers prior to hydrolysis of the siloxane end groups to form moisture stabilized polymers.

20 Claims, No Drawings

METHOD TO CONTROL INCREASE IN VISCOSITY DURING AGING OF SILOXANE MODIFIED POLYMERS

FIELD OF THE INVENTION

This invention relates generally to a method for controlling the increase in Mooney viscosity during aging of siloxane-modified polymers. More particularly, the invention relates to a method for stabilizing and slowing substantially the rise in Mooney viscosity at any given level upon aging of these siloxane-modified polymers.

BACKGROUND OF THE INVENTION

Elastomeric polymers such as styrene-butadiene rubbers having a styrene content of from about 20 percent to about 35 percent are commonly produced in inert organic solvents such as hexane. These polymers can be terminated by a number of different compounds including silane containing compounds to yield silane end-capped polymers. This siloxane termination can also result in an increase in the Mooney viscosity of the treated polymer similar to the increase that occurs during tin coupling. However, upon subsequent desolventization of the siloxane-terminated polymer through the use of either steam or heated water, an even larger increase in Mooney viscosity often occurs during the hydrolysis of siloxane groups such as pendant —SiOR groups on the siloxane end groups thereby leading to coupling of the polymer via formation of Si—O—bonds between two siloxane end groups.

Thus, a process utilizing steam or heated water in the desolventization of siloxane end-capped polymers containing hydrolyzable groups such as pendant —SiOR groups has always been accompanied by an increase in the Mooney viscosity of the polymers due to hydrolysis and subsequent coupling that occurs between the terminal siloxane groups.

Various attempts have been made to overcome this hydrolysis and coupling problem. For example, U.S. Pat. No. 5,659,056 discloses the use of acids such as $C_1$ to $C_{12}$ aliphatic and $C_6$ to $C_{12}$ cycloaliphatic and aromatic carboxylic acids including acetic acid, propionic acid, butyric acid, decanoic acid, cyclohexanoic acid, benzoic acid and the like, as well as acyl halides thereof, as viscosity stabilizing agents to treat the polymer prior to desolventization. These viscosity stabilizing agents do not react with the siloxane terminal end groups of the polymer, but rather serve to neutralize the by-product lithium compounds in admixture with the polymer, thereby preventing the formation of low boiling alcohols during desolventization at the rate normally produced. Thus, the rate of the hydrolysis reaction and, therefore, the rate of coupling of the polymer which, in turn, correlates to the increase in Mooney viscosity of the siloxane terminated polymer having at least one hydrolyzable substituent on the siloxane end group during contact with water or steam, is slowed substantially. The Mooney viscosity of the polymer can therefore be controlled not only during the desolventization process, but also during subsequent storage of the polymer for a limited period of time where the polymer may be subjected to hydrolysis in the form of moisture in the air or in some other manner.

Other attempts at controlling the Mooney viscosity of siloxane terminated polymers have included the use of alkyl alkoxysilanes such as octyl triethoxysilane as viscosity stabilizing agents. These viscosity stabilizing agents are also added prior to desolventization but, unlike the acids set forth in U.S. Pat. No. 5,659,056, react with the siloxane-terminated polymers. Moreover, these viscosity stabilizing agents, i.e., alkyl alkoxysilanes, have the ability to eliminate, not just slow down, any increase in the Mooney viscosity for a period of time. The successful use of these viscosity stabilizing agents however is extremely concentration dependent. That is, the number of —SiOR groups available from the addition of the viscosity stabilizing agent must be such that any Si—O—Si bonds formed are between the hydrolyzable siloxane terminated polymer and the viscosity stabilizing agent, not between the polymers themselves. Furthermore, alkyl alkoxysilanes are relatively expensive compared to many other materials.

Therefore, the need continues to exist for alternative methods for stabilizing and controlling the rate of increase in Mooney viscosity of siloxane-terminated polymers. Such methods preferably would not be dependent upon the concentration of the added viscosity stabilizing agent and would not affect the pH of the polymer.

SUMMARY OF INVENTION

In general the present invention provides a method for stabilizing the Mooney viscosity of a siloxane-terminated polymer having at least one hydrolyzable substituent on the siloxane end group by adding, after the polymerization but still in the presence of an inert solvent, a viscosity stabilizing effective amount of a long chain alcohol, prior to contacting the polymer with water. For purposes of this disclosure, a "long chain alcohol" can be defined as any monohydric or polyhydric alcohol of the formula $R^1OH$ wherein $R^1$ is a moiety containing a hydrocarbon that may or may not include additional —OH groups, does not include a C=O group next to the —OH group and, therefore, is not an acid, and includes more than the number of carbon atoms found in the siloxane termination group —SiOR of the polymer. More preferably, the long chain alcohol can be selected from the group consisting of aliphatic, cycloaliphatic, and aromatic alcohols having at least 6 carbon atoms and fatty acid esters of hydrogenated and non-hydrogenated $C_5$ and $C_6$ sugars.

The present invention also includes a moisture stabilized polymer comprising the hydrolysis reaction product of a siloxane terminated polymer reacted with a long chain alcohol. More preferably, the alcohol can be selected from the group consisting of aliphatic, cycloaliphatic, and aromatic alcohols having at least 6 carbon atoms and fatty acid esters of hydrogenated and non-hydrogenated $C_5$ and $C_6$ sugars.

The present invention further includes a tire comprising an elastomeric compound containing the moisture stabilized polymer comprising the hydrolysis reaction product of a siloxane terminated polymer reacted with a long chain alcohol. More preferably, the alcohol can be selected from the group consisting of aliphatic, cycloaliphatic, and aromatic alcohols having at least 6 carbon atoms and fatty acid esters of hydrogenated and non-hydrogenated $C_5$ and $C_6$ sugars.

By using a long chain alcohol to react with the siloxane termination on the polymer, the hydrolyzable substituent on the siloxane end groups is made longer and becomes more difficult to hydrolyze, thereby slowing the rate of coupling of the polymer which, in turn, slows and stabilizes the foreseen increase in Mooney viscosity of the siloxane polymer. The reaction, however, is not concentration dependent to the extent that any added long chain alcohol will provide at least some affect in decreasing the rate of hydrolysis and, in turn, the rate of increase in Mooney viscosity.

EMBODIMENTS OF THE INVENTION

As noted hereinabove, the present invention is directed toward a method for controlling and stabilizing, and more particularly, to substantially slowing the increase in Mooney viscosity, particularly during aging, of siloxane-modified polymers. The present invention succeeds in controlling and stabilizing Mooney viscosity by adding an effective amount of a long chain alcohol, preferably having at least 6 carbon atoms, to the siloxane-terminated polymer prior to desolventization or other contact with water such that the alcohol ($R^1OH$) will react with the hydrolyzable substituent (R) of the pendant —SiOR group of the siloxane-terminated polymers and form new, preferably more hydrophobic —$SiOR^1$ groups on the siloxane terminated polymers rather than having the siloxane-terminated polymers couple.

Siloxane-terminated polymers are well known in the art and have been prepared in U.S. Pat. No. 3,244,664 to Zelinski et al. and U.S. Pat. No. 4,185,042 to Verkouw, both of which are herein incorporated by reference. The process of the present invention is particularly applicable to any elastomer having a siloxane-functionalized end group having a hydrolyzable substituent which, when hydrolyzed, is subject to cross linking with other hydrolyzed groups. An exemplary hydrolyzable group is a pendant —SiOR group wherein R is an alkyl, cycloalkyl, or aromatic group capable of coupling with a like or similar pendant —SiOR group to form an Si—O—Si bond.

The polymers end capped with siloxane terminal groups that can be stabilized in accordance with the process of the present invention can be any elastomer known in the art including polybutadiene, polyisoprene, and the like, and copolymers thereof with monovinyl aromatics such as styrene, alpha methyl styrene and the like, and trienes such as myrcene. Thus, the elastomers include diene homopolymers and copolymers thereof with monovinyl aromatic polymers. Exemplary diene homopolymers are those prepared from diolefin monomers having from about 4 to about 12 carbon atoms. Exemplary vinyl aromatic polymers are those prepared from monomers having from about 8 to about 20 carbon atoms. Preferred elastomers include diene homopolymers such as polybutadiene and polyisoprene and copolymers such as styrene butadiene rubber (SBR). Polymers and copolymers can comprise from 100 to about 20 percent by weight of diene units and from 0 to about 80 percent by weight of monovinyl aromatic hydrocarbon or triene units, totaling 100 percent. The copolymers are preferably either random copolymers or block copolymers as is known in the art. Such block copolymers which include poly(styrene-butadiene-styrene) are thermoplastic elastomers. The elastomers utilized and treated in accordance with the process of the present invention display utility in a number of applications including use in the manufacture of tires.

Polymerization of the elastomers is preferably conducted in the presence of the organolithium anionic initiator catalyst composition. The organolithium initiator employed can be any of the anionic organolithium initiators known in the art to be useful in the polymerization of 1,3-diene monomers. In general, the organolithium compounds are hydrocarbyl lithium compounds of the formula $R(Li)_x$ wherein R represents hydrocarbyl groups containing from one to about 20 carbon atoms, and preferably from about 2 to about 8 carbon atoms and x is an integer from 1 to 2. Although the hydrocarbyl group is preferably an aliphatic group, the hydrocarbyl group can also be cycloaliphatic or aromatic. The aliphatic groups can be primary, secondary, or tertiary groups although the primary and secondary groups are preferred. Examples of aliphatic hydrocarbyl groups include methyl, ethyl, n-propyl, isopropyl, n-butyl, sec-butyl, t-butyl, n-amyl, sec-amyl, n-hexyl, sec-hexyl, n-heptyl, n-octyl, n-nonyl, n-dodecyl, and octa-decyl. The aliphatic groups can contain some unsaturation such as allyl, 2-butenyl, and the like. Cycloalkyl groups are exemplified by cyclohexyl, methylcyclohexyl, ethylcyclohexyl, cycloheptyl, cyclopentylmethyl, and methylcyclopentylethyl. Examples of aromatic hydrocarbyl groups include phenyl, tolyl, phenylethyl, benzyl, naphthyl, phenyl cyclohexyl, and the like.

Specific examples of organolithium compounds which are useful as anionic initiators in the polymerization of conjugated dienes in accordance with the process of the present invention include the following: n-butyl lithium, n-propyl lithium, isobutyl lithium, tertiary butyl lithium, amyllithium, and cyclohexyl lithium. Mixtures of different lithium initiator compounds also can be employed preferably containing one or more lithium compounds such as $R(Li)_x$. Other lithium catalysts which can be employed alone or in combination with the hydrocarbyl lithium initiators are tributyl tin lithium, lithium dialkyl amines, lighium dialkyl phosphines, lithium aklyl aryl phosphines and lithium diaryl phosphines. The preferred organolithium initiator is n-butyl lithium and "in situ" produced lithium hexamethylenimide initiator prepared by reacting hexamethyleneimine and n-butyl lithium.

The amount of initiator required to effect the desired polymerization can be varied over a wide range depending upon a number of factors such as the desired polymer molecular weight, the desired 1,2- and 1,4-content of the polydiene, and the desired physical properties for the polymer produced. In general, the amount of initiator utilized can vary from as little as 0.2 millimole of lithium per 100 grams of monomers up to about 100 millimoles of lithium per 100 grams of monomers depending upon the desired polymer molecular weight.

The polymerizations of the present invention are conducted in an inert solvent and are consequently solution polymerizations. The term "inert solvent" means that the solvent does not enter into the structure of the resulting polymer, does not adversely affect the properties of the resulting polymer, and does not adversely affect the activity of the catalyst employed. Suitable inert solvents include hydrocarbon solvents which can contain aliphatic, aromatic or cycloaliphatic hydrocarbons such as hexane, pentane, toluene, benzene, cyclohexane and the like. Ethers such as tetrahydrofuran and tertiary amines such as triethylamine and tributylamine can also be used as solvents, but these will modify the polymerization as to styrene distribution, vinyl content and rate of reaction. The preferred solvents are aliphatic hydrocarbons and of these solvents, hexane is particularly preferred.

Polymerization conditions such as temperature, pressure and time are well known in the art for polymerizing the polymerizable monomers as described with the anionic initiator as described. For example, for illustrative purposes only, the temperature employed in the polymerization are generally not critical and can range from about −60° C. to about 150° C. Preferred polymerization temperatures can range from about 25° C. to about 130° C. for a polymerization time of a few minutes to up to 24 hours or more, and employing pressures generally sufficient to maintain polymerization admixtures substantially in the liquid phase, preferably at or near atmospheric pressure, depending on the temperature and other reaction parameters. Polymerization of any of the above-identified monomers in the presence of an organolithium initiator results in the formation of a "living polymer". The lithium proceeds to move down the growing chain as polymerization continues. The "living polymer" from the foregoing monomers, has the following general formula:

Polymer-Li wherein the polymer is any of the foregoing elastomers, diene homopolymers, diene/monvinyl aromatic random copolymers and block copolymers.

In order to promote randomization in copolymerization and to control vinyl content, one or more modifiers may optionally be added to the polymerization ingredients. Amounts range from between 0 and about 90 or more equivalents per equivalent of lithium. Compounds useful as modifiers are typically organic and include those having an oxygen or nitrogen hetero-atom and a non-bonded pair of electrons. Examples include dialkyl ethers of mono and oligo alkylene glycols; "crown" ethers; tertiary amines such as tetramethyethylene diarnine (TMEDA); tetrahydrofuran (THF), THF oligomers linear and cyclic oligomeric oxolanyl alkanes and the like. Particular examples of these modifiers include potassium t-butylamylate and 2,2'-di (tetrahydrofuryl) propane. These modifiers can be found in U.S. Pat. No. 4,429,091, owned by the Assignee of record.

Polymerization is begun by charging a blend of the monomer(s) and solvent to a suitable reaction vessel, followed by the addition of the modifier(s) and the initiator solution previously described. The procedure is carried out under anhydrous, anaerobic conditions. The reactants can be heated to a temperature of from about 23° C. to about 120° C., and are typically agitated for about 0.15 to about 24 hours. After polymerization is complete, the product can be removed from the heat and terminated with a siloxane end group as is readily known in the art, although termination could also be done without removal of heat. Prior to terminating the polymerization reaction with a siloxane end group, a tin coupling agent can be added to the polymerization reaction to increase the Mooney viscosity to a desired range. Tin coupling agents such as tin tetrachloride ($SnCl_4$) are well known in the art and can be added in varying amounts, typically in amounts of 0 to about 0.9 mole equivalents per each mole equivalent of anionic initiator depending upon the desired Mooney viscosity of the polymer.

The siloxane terminated polymers to be treated in the process of the present invention include any elastomer having a terminal siloxane end group in which the siloxane end group contains one or more hydrolyzable pendant substituents.

Exemplary siloxane terminated polymers are represented by the following structural formula:

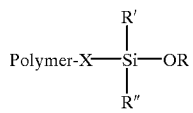

wherein X may be present or not present and represents a linking agent or a linking molecule, and wherein R is a $C_1$ to $C_{18}$ alkyl, $C_4$ to $C_8$ cycloalkyl or $C_6$ to $C_{18}$ aromatic group, and R' and R" may be the same or different and are selected from the group consisting of —OR, a $C_1$ to $C_{18}$ alkyl, $C_4$ to $C_8$ cycloalkyl or $C_6$ to $C_{18}$ aromatic group.

Optionally, upon termination, the siloxane terminated polymer would then be coagulated and quenched, if necessary, dried, and/or then undergo desolventization. Quenching can be conducted, if necessary, by contacting the siloxane terminated polymer with a quenching agent for about 0.05 to about 2 hours at temperatures of from about 30° C. to about 120° C. to insure complete reaction. Suitable quenching agents include carboxylic acids such 2-ethyl hexanoic acid (EHA), acetic acid and the like. Coagulation is typically done with alcohols such as methanol or isopropanol. Alternative to, or in combination with, the step of quenching, the siloxane terminated polymer can be drum dried as is well known in the art. The use of steam or high heat to remove solvent is also well known in the art.

However, in the process of the present invention, and prior to quenching, drying or removing the solvent, the present invention adds at least one long chain alcohol having the structural formula, $R^1OH$ wherein $R^1$ is a moiety containing a hydrocarbon having more carbon atoms than were present in the hydrolyzable substituent (R) of the pendant —SiOR group of the siloxane-terminated polymer. Preferably, $R^1$ includes at least six carbon atoms.

Essentially any long chain alcohol compatible with the polymer employed can be used in the present invention. To be compatible, the alcohol should be at least partially soluble in the inert solvent and the rubber polymer, and capable of interacting with the —SiOR group of the siloxane terminated polymer. Essentially any high boiling alcohol will be compatible. For purposes of this disclosure, a "high boiling alcohol" is one having a boiling point higher than that of ethanol.

Still more preferably, essentially any monohydric or polyhydric alcohol that would not be readily removed by azeotroping with water would be suitable for use in the present invention. That is, the alcohol used in the present invention should be capable of reacting with the siloxane termination on the polymer such that a new, longer and more hydrolytically stable hydrolyzable substituent can be formed on the siloxane end groups. Generally, the longer or more complex the substituent, the more hydrolytically stable the polymer will be. Reacting the polymer with an alcohol which will not significantly azeotrope with water during steam desolventization will, in turn, result in a polymer which is less likely to couple to itself, thereby slowing and stabilizing the increase in Mooney viscosity of the siloxane polymer.

Long chain alcohols of the present invention particularly suitable for use in the present invention include those selected from the group consisting of aliphatic, cycloaliphatic, and aromatic alcohols having at least six carbon atoms and fatty acid esters of hydrogenated and non-hydrogenated $C_5$ and $C_6$ sugars, e.g., sorbitose, mannitose, and arabinose. Branched structures are even more preferred. One preferred example of an aliphatic alcohol suitable for use in the present invention is 2-ethylhexyl alcohol.

With respect to the fatty acid esters of hydrogenated and non-hydrogenated $C_5$ and $C_6$ sugars, these compounds have at least three hydroxyl groups and from one to 3.5 ester groups (sesqui esters). The esterified hydrogenated and non-hydrogenated sugars can be described generally by the following formula using sorbitol as the representative ester

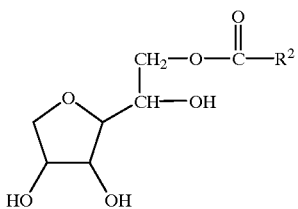

where $R^2$ is derived from $C_{10}$ to $C_{22}$ saturated and unsaturated fatty acids, for example, stearic, lauric, palmitic, oleic, and the like.

Representative examples include the sorbitan oleates, including monooleate, dioleate, trioleate, and sesquioleate, as well as sorbitan esters of laurate, palmitate, and stearate fatty acids, and derivatives thereof, as well as other polyols including glycols, such as polyhydroxy compounds and the like. Of these, sorbitan oleates are preferred, with sorbitan monooleate being most preferred. In similar fashion, other esters can be formed with mannitose and arabinose.

These alcohols are commercially available from ICI Specialty Chemicals under the tradename SPAN, which is a registered trademark of ICI. Several useful products include SPAN 60 (sorbitan stearate); SPAN 80 (sorbitan monooleate); and SPAN 85 (sorbitan trioleate). Other commercially available sorbitans can be used, and examples include those sorbitan monooleates known as Alkamuls SMO; Capmul O; Glycomul O; Arlacel 80; Emsorb 2500; and S-Maz 80. Similar products of other esters are likewise available.

The long chain alcohols of the present invention can be employed in varying amounts depending upon the number of siloxane termination functionalities present in the polymer. Generally, the amount of alcohol used in the process can range from about 1 to about 10 mole equivalents per mole equivalent of anionic initiator, and more preferably, from about 1 to about 5 mole equivalents per mole equivalent of anionic initiator.

Depending upon the process utilized in the drying and/or desolventization process, additional alcohol can be used.

Thus, it will be appreciated that, in contrast to those disclosures which utilize an acid to neutralize the pH of the composition to slow the increase in Mooney viscosity, the present invention reacts the alcohol with the siloxane terminal end groups of the polymer to provide a new composition. Moreover, in contrast to those processes which reacts an alkyl alkoxysiloxane with the siloxane terminal end groups of provide an alternative Si—O—Si Si bond to the polymer coupling, the present invention reacts the alcohol with the siloxane terminal group to obtain a different, more hydrolytically stable (i.e., hydrophobic) terminal —SiOR group. While the present invention only offers an alternative method of substantially slowing the rate of increase of Mooney viscosity for the polymer (like the acids which neutralize the pH of the polymer), it is not concentration dependent. Moreover, the alcohols of the present invention are much less expensive than the materials used in the prior art.

For a proper understanding of the invention, the following reaction schemes show first the hydrolysis reaction which occurs. This reaction (shown as Scheme I) is well known in the art and typically leads to the coupling of siloxane-terminated polymers through the subsequent formation of Si—O—Si bonds (Scheme II).

Scheme I

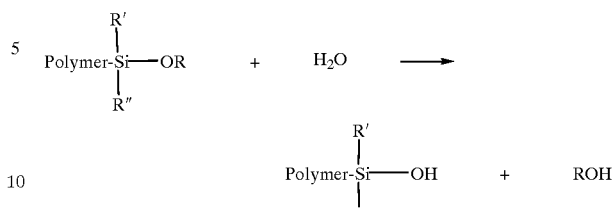

Scheme II

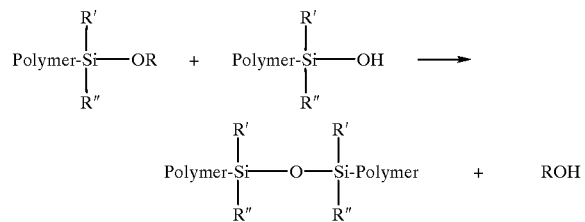

However, the present invention uses a long chain alcohol ($R^1OH$) to react with the —SiOR groups available from the polymer to form new —$SiOR^1$ termination groups as shown in Scheme III.

Scheme III

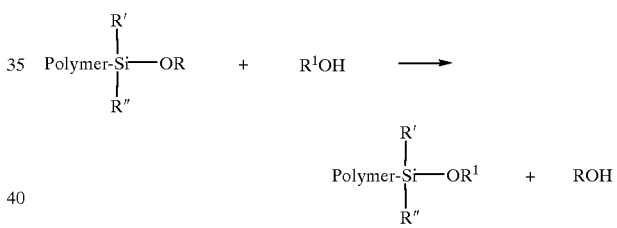

As shown, a new moisture stabilized polymer is produced. This reaction is advantageous because the substituent, $R^1$, will always be larger or longer, i.e., have more carbon atoms, than the original hydrolyzable substituent, R, which typically will have between 1 and 5 carbon atoms. While it has been noted previously that R can be a $C_1$ to $C_{18}$ alkyl $C_4$ to $C_8$ cycloalkyl or $C_6$ to $C_8$ aromatic group, and R' and R" may be the same or different and can be selected from the group consisting of —OR, a $C_1$ to $C_{18}$ alkyl, $C_4$ to $C_8$ cycloalkyl or $C_6$ to $C_{18}$ aromatic group, R, R' and R" will usually not exceed six carbon atoms. However, where a larger moiety is used, it will be appreciated that $R^1$ will, in turn, also use a larger moiety containing more carbon atoms than does the R moiety.

Having undergone the reaction set forth above, this new moisture stabilized polymer is much less susceptible to hydrolysis and the accompanying increase in Mooney viscosity due to coupling of the hydrolyzable siloxane end groups on the polymers. The longer and more complex the hydrolyzable substituent is, the more difficult it is for the hydrolysis reaction to occur. Of course, hydrolysis will eventually occur over time, but not without difficulty. Thus, upon aging, there will be only a slow increase in Mooney viscosity. The ability of the polymers to form Si—O—Si bonds between the polymers is significantly reduced by the addition of long chain, high boiling alcohols. In addition to the alcohol an antioxidant such as 2,6-di-t-butyl-4-methylphenol or other butylated hydoxy toluene (BHT) can be added in solvent (hexane) solution as is well known in the art. The antioxidant further insures that the Mooney viscosity stability will result by prevention of oxidative coupling.

In order to demonstrate practice of the present invention, the following syntheses of the present invention and control compositions were prepared. Each of the examples provided hereinbelow are for illustrative purposes only and should not be construed as limiting the present invention in any way, the scope and spirit of the invention being determined by the claims which follow.

SAMPLE 1

Control

Alkoxysilane-terminated styrene-butadiene rubber (SBR) was prepared under anhydrous and anaerobic conditions in a one-gallon, jacketed, stainless steel reactor fit with a stirrer. Specifically, 0.07 kg of hexane, 0.41 kg of 33.0% by weight styrene in hexane, and 1.74 kg of 27.5% by weight butadiene in hexane were added to the reactor. Then, "in situ" lithium hexamethyleneimide initiator was prepared by adding 0.63 ml of 0.6 M potassium t-butylamylate in hexane, 1.42 ml of 3.54 M hexamethyleneimine in cyclohexane, 0.28 ml of 1.6 M 2,2'-di(tetrahydrofuryl) propane in hexane, and 3.93 ml of 1.6 M n-butyllithium in hexane to the reactor and raising the jacket temperature to 50° C. After 2 hours, 2.20 ml of 0.25 M $SnCl_4$ in hexane was added to the reactor. Fifteen minutes later, 0.63 ml of 4.48 M tetraethoxysilane was added to the reactor, thereby terminating the living polymerization reaction. The polymer cement was then dropped from the reactor into a vessel containing isopropanol and an antioxidant and drum dried, removing the solvent. The dried polymer had the following properties: $ML_{1+4}$ (100° C.) =52.4; Wt. % styrene=28.4; Wt. % block styrene=11.9; Wt. % 1,2-butadiene=20.1; Wt. % 1,4-butadiene=51.4; Tg=−43.63° C., Mw=$3.27\times10^5$; and Mn=$1.50\times10^5$. In all the examples, viscosity was determined using a Mooney viscometer; weight percents were determined using NMR; glass transition temperature was determined using DSC; and molecular weights were determined using GPC.

SAMPLE 2

Alkoxysilane-terminated styrene-butadiene rubber (SBR) treated with 2-ethylhexyl alcohol was prepared under anhydrous and anaerobic conditions in a five-gallon, jacketed, stainless steel reactor fit with a stirrer. Specifically, 0.513 kg of hexane, 1.16 kg of 33.0% by weight styrene in hexane, and 3.95 kg of 27.5% by weight butadiene in hexane were added to the reactor. Then, "in situ" lithium hexamethyleneimide initiator was prepared by adding 1.76 ml of 0.6 M potassium t-butylamylate in hexane, 3.98 ml of 3.54 M hexamethyleneimine in cyclohexane, 0.77 ml of 1.6 M 2,2'-di(tetrahydrofuryl) propane in hexane, and 11.01 ml of 1.6 M n-butyllithium in hexane to the reactor and raising the jacket temperature to 37.8° C. After 4 hours, 6.17 ml of 0.25 M $SnCl_4$ in hexane was added to the reactor. Fifteen minutes later, 7.08 ml of 1.12 M tetraethoxysilane was added to the reactor, thereby terminating the living polymerization reaction. After another fifteen minutes, 47.6 ml of 1 M 2-ethylhexanol was added to the reactor and the batch was heated to 93.3° C. for an hour. The temperature was then lowered to 65.6° C. for 12 hours and the polymer cement was dropped from the reactor and steam desolventized. From GC analysis of the resulting polymer, approximately 73.7 percent of the ethoxy groups were replaced with 2-ethylhexyloxy groups on the polymer. The dried polymer had the following properties: $ML_{1+4}$ (100° C.)=35.2; Wt. % styrene=26.2; Wt. % block styrene=9.9; Wt. % 1,2-butadiene=31.4; Wt. % 1,4-butadiene=42.4; Tg=−43.63° C., Mw=$2.04\times10^5$; and Mn=$1.38\times10^5$.

SAMPLE 3

Acid-Treated

Alkoxysilane-terminated styrene-butadiene rubber (SBR) treated with 2-ethylhexanoic acid (EHA) was next prepared under anhydrous and anaerobic conditions in a one-gallon, jacketed, stainless steel reactor fit with a stirrer. Specifically, 0.04 kg of hexane, 0.41 kg of 33.0% by weight styrene in hexane, and 1.76 kg of 22.0% by weight butadiene in hexane were added to the reactor. Then, "in situ" lithium hexamethyleneimide initiator was prepared by adding 0.63 ml of 0.6 M potassium t-butylamylate in hexane, 1.42 ml of 3.54 M hexamethyleneimine in cyclohexane, 0.28 ml of 1.6 M 2,2'-di(tetrahydrofuryl) propane in hexane, and 3.93 ml of 1.6 M n-butyllithium in hexane to the reactor and raisin the jacket temperature to 50° C. After 50 minutes, 2.20 ml of 0.25 M $SnCl_4$ in hexane was added to the reactor. Fifteen minutes later, 0.63 ml of 1.12 M tetraethoxysilane was added to the reactor, thereby terminating the living polymerization reaction. After another fifteen minutes, 6.66 ml of 1 M 2-ethylhexanoic acid in hexane was added to the reactor. Five minutes later, the polymer cement was then coagulated in isopropanol. An antioxidant was also present. The dried polymer had the following properties: Mooney viscometer $ML_{1+4}$ (100° C.)=32.3; Wt. % styrene=27.7; Wt. % block styrene=11.4; Wt. % 1,2-butadiene=26.0; Wt. % 1,4-butadiene=46.3; Tg) =−52.3° C., Mw=$1.77\times10^5$; and Mn=$1.25\times10^5$.

SAMPLE 4

Alkoxysilane-terminated styrene-butadiene rubber (SBR) treated with sorbitan monooleate (SMO) in a 5:1 ratio of sorbitan monooleate to anionic initiator was next prepared under anhydrous and anaerobic conditions in a one-gallon, jacketed, stainless steel reactor fit with a stirrer. Specifically, 0.04 kg of hexane, 0.41 kg of 33.0% by weight styrene in hexane, and 1.76 kg of 22.0% by weight butadiene in hexane were added to the reactor. Then, "in situ" lithium hexamethyleneimide initiator was prepared by adding 0.63 ml of 0.6 M potassium t-butylamylate in hexane, 1.42 ml of 3.54 M hexamethyleneimine in cyclohexane, 0.28 ml of 1.6 M 2,2'-di(tetrahydrofuryl) propane in hexane, and 3.93 ml of 1.6 M n-butyllithium in hexane to the reactor and raising the jacket temperature to 37.8° C. After 1.5 hours, 2.20 ml of 0.25 M $SnCl_{14}$ in hexane was added to the reactor. Fifteen minutes later, 0.63 ml of 1.12 M tetraethoxysilane was added to the reactor, thereby terminating the living polymerization reaction. After another twenty minutes, 31.43 ml of 1 M sorbitan monooleate in hexane was added to the reactor, and the batch was heated to 65.6° C. for thirty minutes. The polymer cement was then coagulated in a vessel containing isopropanol and an antioxidant and drum dried. The dried polymer had the following properties: $ML_{1+4}$ (100° C.)= 47.8; Wt. % styrene=33.5; Wt. % block styrene=17.7; Wt. % 1,2-butadiene=19.4; Wt. % 1,4-butadiene=47.1; Tg=−50.7° C., Mw=$2.4\times10^5$; and Mn=$1.59\times10^5$.

SAMPLE 5

Alkoxysilane-terminated styrene-butadiene rubber (SBR) treated with sorbitan monooleate (SMO) in a 1:1 ratio of sorbitan monooleate to anionic initiator was next prepared under anhydrous and anaerobic conditions in a one-gallon, jacketed, stainless steel reactor fit with a stirrer. Specifically, 0.04 kg of hexane, 0.41 kg of 33.0% by weight styrene in hexane, and 1.76 kg of 22.0% by weight butadiene in hexane were added to the reactor. Then, "in situ" lithium hexamethyleneimide initiator was prepared by adding 0.63 ml of 0.6 M potassium t-butylamylate in hexane, 1.42 ml of 3.54 M hexamethyleneimine in cyclohexane, 0.28 ml of 1.6 M 2,2'-di(tetrahydrofuryl) propane in hexane, and 3.93 ml of 1.6 M n-butyllithium in hexane to the reactor and raising the jacket temperature to 37.8° C. After 1.5 hours, 2.20 ml of 0.25 M $SnCl_4$ in hexane was added to the reactor. Fifteen minutes later, 0.63 ml of 1.12 M tetraethoxysilane was added to the reactor, thereby terminating the living polymerization reaction. After another twenty minutes, 6.29 ml of 1 M sorbitan monooleate in hexane was added to the reactor, and the batch was heated to 65.6° C. for thirty minutes. The polymer cement was then coagulated in a vessel containing isopropanol and an antioxidant and drum dried. The dried polymer had the following properties: $ML_{1+4}$ (100° C.)=27.2; Wt. % styrene=27.9; Wt. % block styrene) =11.2; Wt. % 1,2-butadiene=19.8; Wt. % 1,4-butadiene=52.3; Tg=−53.8° C., Mw=$1.67×10^5$; and Mn $1.11×10^5$.

SAMPLE 6

Alkoxysilane-terminated styrene-butadiene rubber (SBR) treated with sorbitan monooleate (SMO) in a 1:1 ratio of sorbitan monooleate to anionic initiator was next prepared under anhydrous and anaerobic conditions in a two-gallon, jacketed, stainless steel reactor fit with a stirrer. Specifically, 0.19 kg of hexane, 1.82 kg of 33.0% by weight styrene in hexane, and 7.88 kg of 21.7% by weight butadiene in hexane were added to the reactor. Then, "in situ" lithium hexamethyleneimide initiator was prepared by adding 1.26 ml of 0.6 M potassium t-butylamylate in hexane, 2.84 ml of 3.54 M hexamethyleneimine in cyclohexane, 0.55 ml of 1.6 M 2,2'-di(tetrahydrofuryl) propane in hexane, and 7.86 ml of 1.6 M n-butyllithium in hexane to the reactor and raising the jacket temperature to 46.1° C. After 1.1 hours, 4.40 ml of 0.25 M $SnCl_4$ in hexane was added to the reactor. Fifteen minutes later, 5.66 ml of 1 M tetraethoxysilane was added to the reactor, thereby terminating the living polymerization reaction. After another fifteen minutes, 12.57 ml of 1 M sorbitan monooleate in hexane was added to the reactor, and the batch immediately discharged into a vessel containing an antioxidant. The polymer cement was then steam desolventized. The dried polymer had the following properties: $ML_{1+4}$ (100° C.)=37.7; Wt. % styrene=27.3; Wt. % block styrene=11.7; Wt. % 1,2-butadiene=21.1; Wt. % 1,4-butadiene=51.6; Tg=−50.0° C., Mw=$2.74×10^5$; and Mn=$1.23×10_5$.

SAMPLE 7

Alkoxysilane-terminated styrene-butadiene rubber (SBR) treated with sorbitan monooleate (SMO) in a 5:1 ratio of sorbitan monooleate to anionic initiator was next prepared under anhydrous and anaerobic conditions in a two-gallon, jacketed, stainless steel reactor fit with a stirrer. Specifically, 0.19 kg of hexane, 1.82 kg of 33.0% by weight styrene in hexane, and 7.88 kg of 21.7% by weight butadiene in hexane were added to the reactor. Then, "in situ" lithium hexamethyleneimide initiator was prepared by adding 1.26 ml of 0.6 M potassium t-butylamylate in hexane, 2.84 ml of 3.54 M hexamethyleneimine in cyclohexane, 0.55 ml of 1.6 M 2,2'-di(tetrahydrofuryl) propane in hexane, and 7.86 ml of 1.6 M n-butyllithium in hexane to the reactor and raising the jacket temperature to 46.1° C. After 2.3 hours, 4.40 ml of 0.25 M $SnCl_4$ in hexane was added to the reactor. Fifteen minutes later, 5.66 ml of 1 M tetraethoxysilane was added to the reactor, thereby terminating the living polymerization reaction. After another fifteen minutes, 62.87 ml of 1 M sorbitan monooleate in hexane was added to the reactor, and the batch was immediately discharged into a vessel containing an antioxidant. The polymer cement was then steam desolventized. The dried polymer had the following properties: $ML_{1+4}$ (100° C.)=30.5; Wt. % styrene=26.9; Wt. % block styrene=11.1; Wt. % 1,2-butadiene) =23.4; Wt. % 1,4-butadiene=49.7; Tg=−46.5° C., Mw=$1.87×10^5$; and Mn=$1.22×10^5$.

The resultant polymer samples 1 and 2 were recovered and aged at 55° C. and 85% humidity for 9 days, while samples 3, 4 and 5 were recovered and aged at 55° C. and 85% humidity for 17 days and samples 6 and 7 were recovered by steam desolventization and aged at 55° C. and 85% humidity for 15 days. Mooney viscosity (100% at 100° C.) was measured at 1, 2, 5, 7 and 9 days for samples 1 and 2, while the Mooney viscosity of samples 3, 4 and 5 was measured over 17 days and the Mooney viscosity of Samples 6 and 7 was measured over 15 days. The results of the Mooney viscosity tests are shown in Table I.

TABLE I

Mooney Viscosity of Polymer Samples During Aging at 55° C. and 85% Humidity
Viscosity ($ML_{1+4}$)

| Time (days) | Sample 1 (Control) | Sample 2 (Alcohol-Treated) | Sample 3 (Acid-Treated) | Sample 4 (SMO-Treated) (5:1) | Sample 5 (SMO-Treated) (1:1) | Sample 6 (SMO-Treated) (1:1) | Sample 7 (SMO-Treated) (5:1) |
|---|---|---|---|---|---|---|---|
| 0 | 52.4 | 35.2 | 32.3 | 27.2 | 47.8 | 37.7 | 30.5 |
| 1 | 56.4 | 37.4 | 32.2 | 27.7 | 48.8 | 38.6 | 29.6 |
| 2 | 58.5 | 36.3 | 33.5 | 27.7 | 49.1 | 39.6 | 30.4 |
| 3 | — | — | 33.7 | 27.3 | 48.7 | — | — |
| 5 | 59.1 | 37.7 | — | — | — | 42.2 | 31.0 |
| 6 | — | — | 36.3 | 27.7 | 49.5 | — | — |
| 7 | 61.4 | 39.9 | — | — | — | — | — |
| 9 | 66.4 | 39.9 | — | — | — | 44.7 | 33.2 |
| 10 | — | — | 37.3 | 28.2 | 49.0 | — | — |
| 15 | — | — | — | — | — | 46.9 | 36.2 |
| 17 | — | — | 39.9 | 28.5 | 49.5 | — | — |

Upon review of the results of the tests, it can be seen that Mooney viscosity does not significantly increase upon aging of the samples treated with alcohol. The Mooney viscosity of the samples which remained untreated or treated with acid increased by 14.0 Mooney units and from 7.6 Mooney units, respectively. However, the Mooney viscosity of the alcohol treated samples and drum dried increased by no more than 4.7 units (Sample 2) and, with the sorbitan samples, increased by less than 2 Mooney units each time over seventeen days. Those samples which were steam desolventized (Samples 6 and 7) showed more of an increase in Mooney viscosity than did the drum dried samples, but showed only a 9.2 Mooney unit and 5.7 Mooney unit increase, respectively, over 15 days. It is believed that a higher ratio of sorbitan to anionic initiator can aid in stabilizing the increase in Mooney viscosity.

Thus, it should be evident that the synthesis methods of the present invention and use of a long chain alcohol in the process are highly effective in controlling any rise in Mooney viscosity upon aging of a siloxane-modified polymer. The invention is particularly suited for alkoxysilane terminated polymers, but is not necessarily limited thereto. The moisture stabilized polymers and method of the present invention can be used separately with other equipment, methods and the like, to produce various elastomeric materials or compounds suitable for use in the production of various articles including pneumatic tires and the like.

Based upon the foregoing disclosure, it should now be apparent that the use of the long chain alcohol in the process described herein will carry out the objects of the present invention. It is, therefore, to be understood that any variations evident fall within the scope of the claimed invention and thus, the selection of specific component elements can be determined without departing from the spirit of the invention herein disclosed and described. In particular, the long chain alcohols according to the present invention are not necessarily limited to 2-ethylhexyl alcohol or sorbitan monooleate, but rather to any suitable, preferably high boiling alcohol capable of reacting with the siloxane-functionalized polymer and having more carbon atoms than the moiety it is replacing. Moreover, as noted hereinabove, other polymers can be substituted for the styrene-butadiene rubber exemplified. Thus, the scope of the invention shall include all modifications and variations that can fall within the scope of the attached claims.

What is claimed is:

1. A method for stabilizing the Mooney viscosity of a siloxane-terminated polymer having at least one hydrolyzable substituent on the siloxane end group by reacting the siloxane-terminated polymer, after the polymerization but still in the presence of an inert solvent, with a viscosity stabilizing effective amount of a long chain alcohol, prior to contacting the polymer with water.

2. The method of claim 1 wherein said long chain alcohol is selected from the group consisting of aliphatic, cycloaliphatic, and aromatic alcohols having more carbon atoms than the hydrolyzable substituent.

3. The method of claim 1 wherein said long chain alcohol is selected from the group consisting of aliphatic, cycloaliphatic, and aromatic alcohols having at least six carbon atoms.

4. The method of claim 1 wherein said long chain alcohol is selected from the group consisting of multi-hydroxy fatty acid esters of hydrogenated and non-hydrogenated $C_5$ and $C_6$ sugars and branched aliphatic alcohols.

5. The method of claim 1 wherein said long chain alcohol is 2-ethylhexyl alcohol.

6. The method of claim 1 wherein said long chain alcohol is selected from the group consisting of sorbitan oleate, sorbitan laurate, sorbitan palmitate, and sorbitan strearate.

7. The method of claim 1 wherein said long chain alcohol is sorbitan monooleate, sorbitan dioleate, sorbitan trioleate, and sorbitan sesquioleate.

8. The method of claim 1 wherein said viscosity stabilizing effective amount of said long chain alcohol is from about 1 to about 10 mole equivalents of the viscosity stabilizing alcohol per each mole equivalent of an anionic initiator used in the polymerization of the siloxane terminated polymer.

9. The method of claim 8 wherein said viscosity stabilizing effective amount of said viscosity stabilizing agent is from about 1 to about 5 mole equivalents of the viscosity stabilizing agent per each mole equivalent of said anionic initiator used in the polymerization of the siloxane terminated polymer.

10. The method of claim 8, wherein the molar ratio of the long chain alcohol to the anionic initiator is at least 1:1.

11. The method of claim 1 wherein the step of contacting the siloxane terminated polymer with water comprises contacting the siloxane terminated polymer with moisture during storage.

12. The method of claim 1 wherein the long chain alcohol is at least partially soluble in the solvent used in the polymerization of the siloxane terminated polymer.

13. A moisture stabilized polymer comprising the hydrolysis reaction product of a siloxane terminated polymer having at least two hydrolyzable substituents reacted with a long chain alcohol, wherein said long chain alcohol has more carbon atoms than the hydrolyzable substituents, and wherein at least a portion of the hydrolyzable substituents remain in the reaction product.

14. The moisture stabilized polymer of claim 13 wherein said long chain alcohol is selected from the group consisting of aliphatic, cycloaliphatic, and aromatic alcohols.

15. The moisture stabilized polymer of claim 13 wherein said long chain alcohol is selected from the group consisting of aliphatic, cycloaliphatic, and aromatic alcohols having at least six carbon atoms.

16. The moisture stabilized polymer comprising the hydrolysis reaction product of a siloxane terminated polymer reacted with a long chain alcohol, wherein said long chain alcohol is selected from the group consisting of multi-hydroxy fatty acid esters of hydrogenated and non-hydrogenated C5 and C6 sugars and branched aliphatic alcohols.

17. The moisture stabilized polymer of claim 13 wherein said long chain alcohol is 2-ethylhexyl alcohol.

18. The moisture stabilized polymer of claim 16 wherein said long chain alcohol is selected from the group consisting of sorbitan oleate, sorbitan laurate, sorbitan palmitate, and sorbitan strearate.

19. The moisture stabilized polymer of claim 16 wherein said long chain alcohol is sorbitan monooleate, sorbitan dioleate, sorbitan trioleate, and sorbitan sesquioleate.

20. A pneumatic tire comprising an elastomeric compound containing the moisture stabilized polymer of claim 13.

* * * * *